Feb. 12, 1929.  1,701,730
C. H. ROTH ET AL
SYSTEM OF CONTROL FOR ELECTRIC ELEVATOR EQUIPMENT
Filed Sept. 6, 1924
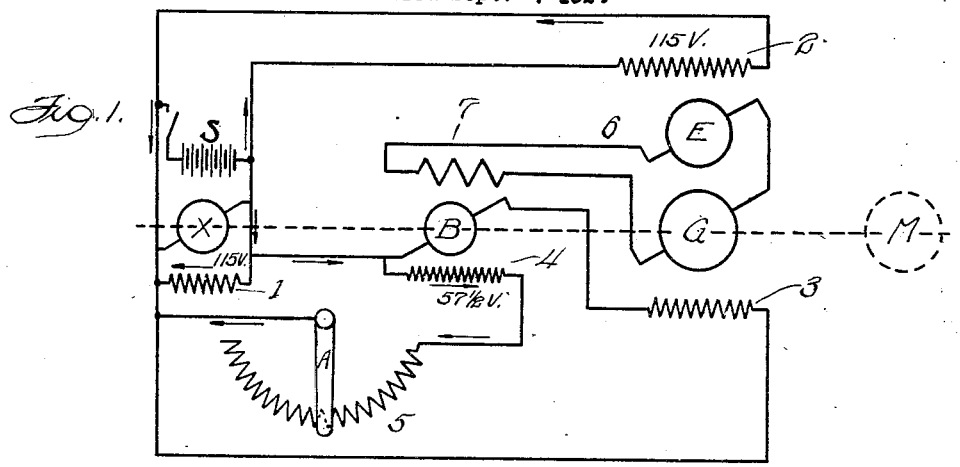
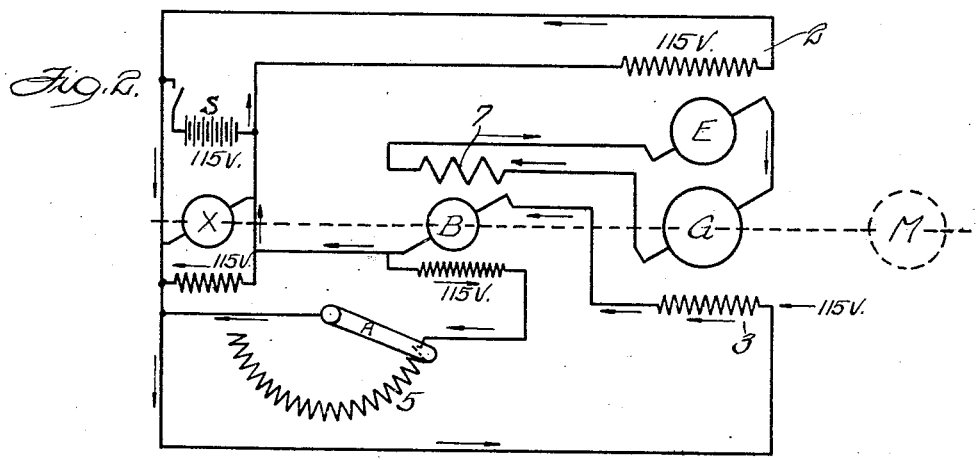
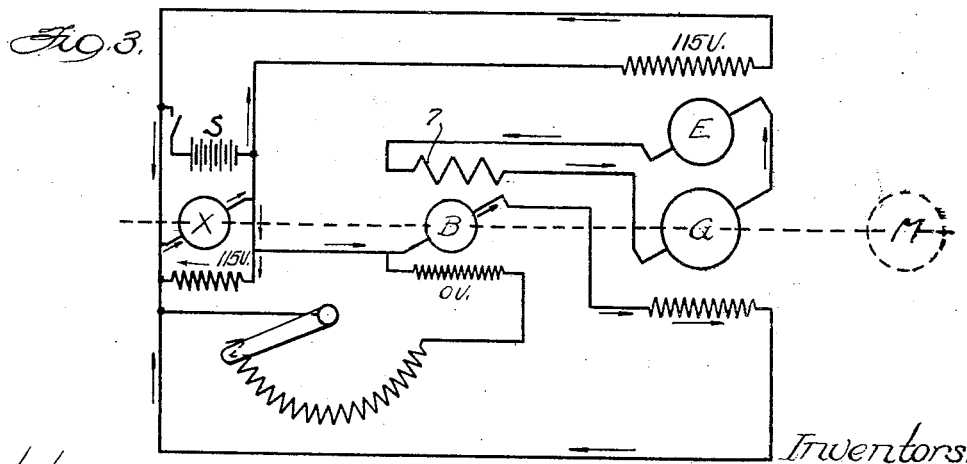
Inventors:
CHARLES H. ROTH
MARTIN SCHIFF Patented Feb. 12, 1929.

1,701,730

UNITED STATES PATENT OFFICE.

CHARLES H. ROTH AND MARTIN SCHIFF, OF CHICAGO, ILLINOIS, ASSIGNOR TO ROTH BROTHERS & CO., OF CHICAGO, ILLINOIS, A CORPORATION OF ILLINOIS.

SYSTEM OF CONTROL FOR ELECTRIC-ELEVATOR EQUIPMENT.

Application filed September 6, 1924. Serial No. 736,309.

The main objects of this invention are to provide, for high speed passenger elevator service of the motor-generator-motor type, a counter electromotive controlling device for the regulation of speed and smoothness of operation; to provide a counter E. M. F. generated by a rotating member in which the amount of E. M. F. and the direction of current is controlled in part manually and in part automatically to meet the requirements of service; to provide a controller-exciter with a simple field regulator which takes the place of the usual elaborate electric elevator control; to provide a controller-exciter which will automatically maintain a constant motor speed in both directions substantially independent of load.

Past practice has required an elaborate system of controlling devices to properly regulate the speed and reverse the elevator motor with a reasonable degree of smoothness of operation. Refinement in elevator motor controlling has tended toward complicated devices and attachments to prevent jerky stops and starts and to provide smooth acceleration and deceleration. The motor-generator-motor system of elevator control is one in which the elevator motor is supplied with current from a generator driven by another motor, and these three machines comprise the principal units. Sometimes a second generator of small size is used for furnishing current to excite the fields of both the elevator motor and of the main generator.

Our improvements in elevator motor control comprise the substitution of a simple field regulating rheostat and a small generator for the complicated controlling devices which have been used in the motor-generator-motor sets.

The elevator motor proper is preferably of the type that normally operates with a full field and the speed variation is obtained by varying the armature voltage. Its actual operating speed, therefore, may be any speed between zero and the maximum in either direction, the maximum speed of the motor being its normal rating. The variation in speed of the elevator motor is obtained by having its field separately excited at a constant value of one polarity, and applying to the armature of the elevator motor a voltage whose value varies in exceedingly minute steps from zero to maximum and back to zero in either positive or negative direction, as the travel of the elevator requires. The current furnished to the elevator motor is supplied by a generator of similar voltage and current characteristics as the elevator motor. This generator has a separately excited field which is reversible in polarity, thereby generating current in the armature of the generator in either direction, which current in turn drives the elevator motor forward or backward. The armature of the elevator motor and the armature of the generator may be permanently connected electrically. The generator is driven by a constant speed motor operating from any suitable alternating or direct current circuit. Exciting current of a constant value for the elevator motor field, for the brake coils (not shown), for auxilliary control apparatus (not shown), and for one polarity of the exciting current for the generator field, is furnished by a small exciter generator of suitable capacity and voltage and a low capacity floating storage battery.

Our invention comprises the use of a system in which a second exciter generator or controller-exciter is used, whose armature is electrically connected in series with the first exciter armature, the action of which is disclosed in the following diagrammatic circuit drawings, in which:—

Fig. 1 shows a motor-generator-motor set with a separate exciter and a controller-exciter, with the latter neutralizing the generator field circuit.

Fig. 2 shows a motor-generator-motor set with the control in such position that the controller-exciter is furnished the current from the generator field.

Fig. 3 shows the motor-generator-motor set with the control in such position that the controller-exciter produces substantially no voltage and the generator field is excited by current from the regular exciter.

In Fig. 1 a driving motor M direct-drives a generator G, an excited X, and a controller-exciter B. The exciter is a shunt machine furnishing current to its own field coil 1, and is directly connected to the field coil 2 of the elevator motor E and a floating storage battery S. The field of the generator is magnetized by the field coil 3, current being supplied by leads from the exciter-generator X. In series with the field coil 3 of the generator is the armature of the controller-exciter B. In parallel with the field coil 3 of the generator and armature of controller-exciter, is the field coil 4 of the controller-exciter, and the control rheostat 5, with a manually operated rheostat handle A.

In the circuit 6 connecting the armature of the generator and elevator motor is a series field coil 7, forming a part of the field winding of the controller-exciter B by its passage around the field cores thereof.

In Fig. 1, the exciter X is rated to deliver 115 volts, and the rheostat handle A is positioned so that the coil 4 of the controller-exciter will receive approximately 57½ volts. The winding and speed of the armature of the controller-exciter B is such that in that particular position of said rheostat the controller-exciter will generate the same voltage as the regulator exciter X, but of opposite polarity, so that no current will flow through the generator field coil 3 because the counter or bucking E. M. F. of the controller-exciter will exactly equal that of the regular exciter, and the result will be a zero current in the field coil of the generator, and a zero current in the entire generator elevator circuit 6.

In Fig. 2, with exactly the same arrangement, except that the controller handle A cuts out all of the resistance, the controller-exciter generates more voltage than the regular exciter, and the resulting current through the field coil 3 is furnished by the controller-exciter. Since the current generated by the controller-exciter is opposite in direction to that of the regular exciter X, the current between the generator and the elevator motor will be in a direction opposite to what it would be if the regular exciter were furnishing the current to magnetize the generator field 3.

In Fig. 3, the rheostat handle A is so positioned at the extreme end of the resistance coil 5, that substantially no current passes through the field coil 4. In this position current will flow through the controller-exciter armature without hindrance, and the generator fields will be magnetized in substantially the same manner as though the controller-exciter did not exist.

In the position of the rheostat handle A, as shown in Fig. 1, no current flows in circuit 6 between the generator and the elevator motor. Hence, the elevator motor would stand still.

In Fig. 2 the generator field is excited by current furnished by the controller-exciter, giving current between the generator and the elevator motor over the circuit 6 at full strength in one direction.

In Fig. 3 the controller-exciter is not generating current, and hence the generator field 3 is excited by the regular exciter X, and current will flow at full strength from the generator to the elevator motor over the circuit 6 in the opposite direction from that shown in Fig. 2.

The circuit 6 is carried through the series coil 7 of the controller-exciter and is so connected that the magnetism produced by the coil 7 will assist the coil 4 under normal operation, but will oppose the function of coil 4 due to reversal of current in circuit 6 when the elevator motor tends to exceed its normal speed, the result being that as the controller-exciter begins to counteract the regular exciter X, the field coil 3 of the generator becomes weaker, causing the generator, now acting as a motor, to speed up, and causing the main motor to now act as a generator, thereby putting a load on the main motor (acting as a generator), whereby the entire system will quickly reach a point of stability where the differences in the elevator speeds under varying conditions of load are nearly zero. If, while being normally operated, the field coil 3 should become disconnected, the armature of main generator G would be a non-opposing or short path for current generated by the elevator motor armature causing dynamic braking thereby bringing the elevator motor to a stop.

In operation, the use of the controller-exciter B whose armature is electrically connected in series with the regular exciter X, performs one of the three following functions:

1st—To furnish zero voltage, thereby allowing the regular exciter to furnish full current to the field coils 3 of the main generator;

2nd—To generate voltage equal to that of the exciter X, but opposing the voltage of the exciter X, neutralizing the entire circuit to the point where no current flows through the main generator field circuit 3. This action is substantially equivalent to an open circuit, yet at no point in the operation is there an open circuit;

3rd—To generate twice the voltage of the exciter X, thereby opposing the voltage of the exciter and furnishing to the field of the main generator current of equal value but of opposite polarity to that furnished by the exciter X when the controller-exciter gives zero voltage.

The controller-exciter B may be called a bucking exciter because it opposes the current of the regular exciter.

The field of the controller-exciter is energized by the regular exciter X. The regular exciter and the controller-exciter can both be driven by the motor that drives the main generator, or they can be separately operated by any other power. The brake mechanism in the elevator, and other electro-receptive devices and auxiliary switches for safety in operation as will be understood, though not shown, may be operated by current furnished by the regular exciter. However, the varying voltage of the controller-exciter may also be used to operate lock-out or other devices (not shown) until the proper time for them to function.

Considering the system in its simplest form, its operation would be as follows:

The controller arm would be in the neutral position, as shown in Fig. 1. The main motor M would be started, driving the main generator G, the exciter X, and the controller-exciter B. The exciter X will build up its own voltage, excite its own field, excite the field of the elevator motor E, and excite the shunt field of the controller-exciter B to a point where the exciter X and the controller exciter B generate equal voltages, but opposed to each other. Under this condition, no current will flow in the circuit between the generator G and the elevator motor E.

When the operator moves the controller arm A for the up direction of the elevator, the connections and positions are as shown in Fig. 2, in which the controller arm A has been moved to reduce and finally cut out all resistance in the field circuit of the controller exciter B, thereby raising the voltage of B, which, overcoming the voltage of the regular exciter X, increases the field strength of the generator G, the voltage of the armature G, and the speed of the elevator motor E. Fig. 2 represents the position of the control for the full speed of the elevator going up.

Fig. 3 represents the positions of control and the direction of the current for full speed of the elevator going down.

To move from the position of full speed up to full speed down, the operator reverses the controller arm A from the position shown in Fig. 2 to that shown in Fig. 3. The operation of reversal comprises first getting to the neutral or central position of the controller arm A, which gives the same voltage to the controller-exciter B and the regular exciter X, which results in no field current for the generator and no current flowing between the generator and the elevator motor. Further movement of the controller arm in a down travel direction gradually reduces the field strength of the exciter-controller and the voltage of its armature, allowing the regular exciter X to furnish current to the field in the proper direction for down travel. A complete reversal of current in the field coils of the generator takes place without opening any electrical circuits.

Experience has proven in operating electrical elevators, that a condition arises when the elevator is heavily loaded for down travel where a loaded car tends to drive the elevator motor E as a generator, this in turn driving the generator as a motor, and the main motor as a generator, a condition which represents a complete reversal of operation of all three machines. This action should of itself stabilize the speed of the system. Due, however, to voltage losses in the various circuits that carry the driving currents, there is a tendency for the elevator motor to gain considerable speed before being checked by the final load delivery back to the power lines.

To overcome this tendency, the circuit between the generator and the elevator motor is carried around the field 7 of the controller exciter so that the main current between the generator and the elevator motor strengthens the fields of the controller exciter under normal operation, but will decrease this field when the elevator tends to exceed its normal speed, the result being that as the controller-exciter now begins to counteract the regular exciter the field of the generator becomes weaker, causing the generator, which under overhaul conditions, acts as a motor, to speed up, causing the main motor, now acting as a generator, to load itself by pumping current into the power mains, and to quickly reach a point of stability where the differences in the elevator speeds under varying conditions of load are substantially zero.

The provision of a low capacity accumulator designed to float on the exciter circuit substantially insures sufficient current to excite the fields of the elevator motor even in case of the complete failure of the driving motor M. The energized field of the elevator motor would, in the event of an overhaul load on the elevator, prevent acceleration due to the short circuit effect of the generator armature.

Although but one specific ambodiment of this invention has been herein shown and described, it will be understood that numerous details of the construction shown may be altered or omitted without departing from the spirit of this invention as defined by the following claims.

We claim:

1. An elevator drive and control system comprising, in combination, a motor, a mechanically driven generator electrically connected in series therewith, said generator having a field coil, a constant voltage exciter to which said coil is connected, said motor having a field coil constantly energized by said exciter, a constantly driven controller-exciter electrically connected in series with the field coil of said generator and said exciter and having a field coil energized by said exciter, and means for regulating the energization of said controller exciter field coil, said generator, exciter and controller-exciter being mechanically connected.

2. In an elevator system a motor, an exciter to energize the field of said motor, a generator to furnish current for the armature of said motor, field exciting current for said generator being supplied from said exciter, a controller-exciter having its armature in series with the field coil of said generator, a field coil for said controller-exciter in series with the main generator elevator motor circuit and a field coil for said controller-exciter taking current from said exciter, a rheostat in the latter said field coil circuit, said rheostat being adapted to manually control the direction and amount of current supplied to the said generator by said controller-exciter.

3. For elevator service, an elevator motor, a driven generator furnishing current to the armature of said elevator motor, an exciter magnetizing the fields of both said elevator motor and said generator, a rotating controller-exciter with its armature in series with the generator field circuit and controlling the direction and magnitude of the current through said generator field circuit, and means providing a magnetizing current and forming part of the field control for said controller exciter, connected in series with the generator armature and elevator motor.

4. In combination, a motor, a generator connected in series with the motor, a field exciter, and a controller exciter, said generator having a field coil connected in series with the field exciter and the controller exciter, said controller exciter being connected to oppose the field exciter when energized, said controller exciter having a field coil connected in series with said field exciter and means for regulating the current in the controller exciter field coil.

Signed at Chicago this 13th day of August, 1924.

CHARLES H. ROTH.

Signed at Chicago this 25th day of August, 1924.

MARTIN SCHIFF.